April 30, 1940.　　　R. M. NARDONE　　　2,198,834
AIRCRAFT APPLIANCE
Original Filed March 31, 1932
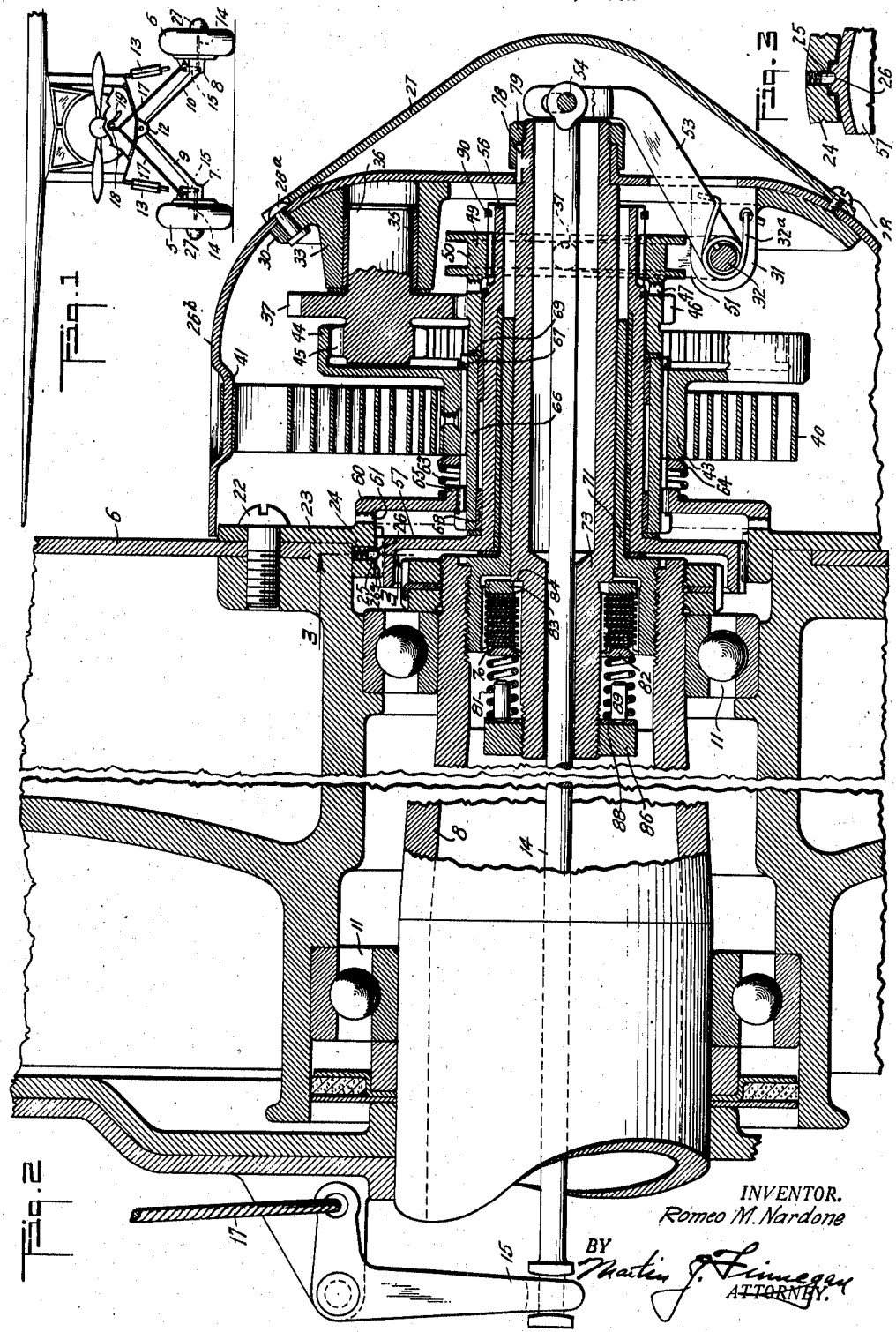
INVENTOR.
Romeo M. Nardone
BY
ATTORNEY.

Patented Apr. 30, 1940

2,198,834

UNITED STATES PATENT OFFICE 2,198,834

AIRCRAFT APPLIANCE

Romeo M. Nardone, East Orange, N. J., assignor, by mesne assignments, to Eclipse Aviation Corporation, East Orange, N. J., a corporation of New Jersey Application March 31, 1932, Serial No. 602,276
Renewed April 7, 1938

5 Claims. (Cl. 244—103)

This invention relates to aircraft appliances and particularly to appliances which facilitate smooth and safe landing of an aircraft.

The invention is herein shown as applied to an airplane of a type requiring tired-wheels as the ground contacting portion of the landing gear, but it is to be understood that in its broadest aspects this invention is applicable to any other type of aircraft having a landing gear.

The large tire of an airplane wheel takes severe punishment when the plane lands, due to the fact that it must, theoretically, assume a speed of rotation corresponding to the landing speed of the ship. The wheels, weighing in some cases six hundred pounds each, and having a large moment of inertia, are forced to slip for some time before reaching the proper speed, and the result is that large pieces of rubber are stripped or burned off the tire at each landing. This action is especially severe when landing on concrete runways.

An object of the present invention is to provide means to start the wheels rotating prior to landing, such that their speed is nearly proportional to the landing speed of the plane. In the preferred embodiment as shown herein, the acceleration is accomplished by means of a spring-type starter where the spring is wound up by the wheel itself, either while taxying or just after leaving the ground. In the latter case, the wheel stores up its energy in the spring, comes to a dead stop, and the apparatus is automatically locked. When landing, a lever, operated from the pilot's compartment, is actuated to release the spring and speed up the wheel to practically the same speed as it had when taking off.

Another object of the invention is to produce a compact, efficient and readily installed and removable mechanism for accomplishing the purposes stated above.

These and other objects will become apparent upon inspection of the following specification and the accompanying drawing, wherein is illustrated the preferred embodiment of the invention. It is to be expressly understood, however, that the drawing is intended merely to serve as an illustration of one mode of embodying the invention in a practical form and is not designed as a definition of the limits of the invention.

In the drawing:

Fig. 1 is a diagrammatic representation of an airplane having landing gears of the type to which the invention may be applied in the manner illustrated in Fig. 2;

Fig. 2 is a vertical axial sectional view through one of the wheels of the landing gear of Fig. 1, showing the invention applied thereto; and Fig. 3 is a transverse section taken along the line 3—3 of Fig. 2.

Referring to the drawing, the invention is shown embodied in a landing gear including a pair of rubber tired wheels 5 and 6 rotatable through the medium of bearings 11 about stationary tubes or axles 7 and 8 respectively forming part of diagonal braces 9 and 10 respectively; the latter being tied into the fuselage of the plane as indicated at 12, and through the usual shock-absorbing means, as indicated at 13. Extending through each tube or axle 7—8 is a rod 14 pivotally connected to one arm of an associated bell crank 15; the other arms of which are adapted to receive cables 17 wound about a pulley 18 and terminating in a handle 19 within reach of the operator of the craft, and serving when drawn taut by the operator to move the rods 14 outwardly through the wheels 5 and 6 for a purpose to appear presently.

Secured to the wheel 6 by suitable means 22 is a plate 23 having a hub 24 transversely drilled to receive a plunger 25 for coaction with sockets 26 and 26a, for a purpose to be hereinafter described; the outer periphery of the plate being surrounded by a cup shaped hub cap 26b to which may be secured a suitable cover 27, the attachment of the cover 27 to the cap 26b being effected by screws 28. A plurality of rivets 28a serve to hold in place, within the cap 26b, a bracket 30 having a laterally extending lug 31 adapted to pivotally receive a rock-shaft 32 for a purpose to be described, and also having a laterally extending hub 33, in its central bore of which is received a friction reducing sleeve 35 in which is journaled the extended hub 36 of a pinion 37 constituting part of a gear train through which the rotation of the flywheel 6 is transmitted to the energy receiving member. As herein shown, the energy is received in a spirally wound spring 40, the outer end of which is secured to a depression 41 in the hub cap 26b, and the inner end to the extended hub 43 of an internally toothed annular gear 44 about which the pinion 37 and a similar pinion 45 (herein shown as integral therewith) rotates as a unit. The pinion 37 in turn meshes with a pinion 46 on one end of which is provided a series of ratchet teeth 47 adapted to be connected by corresponding ratchet teeth on the opposing face of a collar 49, normally urged toward the left by virtue of a coil spring 32a coacting through member 31 and a member 53. In the peripheral groove 50 of this collar, a yoke member 51 is received, the lower end of the yoke being adapted to swing with the previously described rock shaft 32, such motion being imparted thereto by means of the link 53 connected to the end of rod 14. As shown, the collar 49 is splined to the correspondingly splined outer end of a sleeve 56, the said sleeve constituting an integrally elongated extension of a plate 57, the outer rim of which is splined (as best shown in Fig. 3) to engage corresponding splines formed on the interior surface of the hub 24, the members 57 and 24 being normally held against relative axial movement by the provision of the spring pressed plunger 25, above described.

From the foregoing it is apparent that as the craft leaves the ground, in taking off after a run of a certain length along the field, the resulting free rotation of each wheel 6 is effective to wind the corresponding spring 40 through the driving connections 23, 57, 56, 49, 46, gears 37, 45, and 44. In order to hold the energy thus stored in the spring until the pilot is preparing to land, a second ratchet is preferably provided, this second ratchet mechanism also serving to drivably connect the spring with the wheels to cause the transfer to the latter of the stored energy in the spring upon release of the first described rotatable connection shown at 47. In the preferred form as shown, the second ratchet mechanism includes a disc or collar 60 on the outer rim of which are provided ratchet teeth 61 normally held in engagement with corresponding ratchet teeth on the opposing face of hub 24, such engagement being maintained by the force of a coil compression spring 63 abutting at one end a collar 64 adjacent the hub 43 and at its other end surrounding a hub 65 of the disc 60, the said hub having its interior surface splined to engage corresponding splines in the outer cylindrical surface of a sleeve 66, to which sleeve the said hub 43 is also splined and held against axial movement in one direction by a locking ring 67. Suitable friction reducing sleeves 68 are provided between the sleeves 66 and 56 thus facilitating relative rotation of the two sleeves, and for a similar purpose, washers 69 are provided at the other end of the sleeve 66.

Another novel feature of the invention is the provision of a clutch of predetermined torque transmitting capacity adapted to yield to prevent breakage of the spring 40 in the event the jaws 47 should be in engagement while the plane is making its take-off along the field. Preferably this clutch is interposed between a stationary element capable of the movement necessary, as for example, the hub cap 26b to which the outer end of the spring is secured. As shown, the clutch consists of a series of interleaving friction discs 70, certain of which are splined to the inner periphery of a sleeve 71 which is in turn threaded to the end of the axle 8, the other discs being splined to the outer periphery of a shaft 73, in which the rod 14 is slidably received, the said shaft also being provided near its outer end with splines 78 adapted to receive the hub cap 26b, which is centrally apertured and splined to permit its being secured to sleeve 73, while a retaining nut 79 is provided to insure retension of the hub cap in place. The means for regulating the axial pressure on the clutch discs 70 and thus predetermining the torque transmitting capacity of the clutch, comprises preferably a nest of coil compression springs 81 abutting an annular pressure plate 82 which in conjunction with the associated pressure plate 83 holds the discs in assembled relation, the plate 83 having an abutment with a shoulder 84 on the shaft 73. As shown, the pressure of the springs 81 is adjustable by means of nut 86 threaded to the end of the shaft 73, the nut having preferably associated therewith a washer 88 from which extends a series of studs 89 assisting in holding the springs 81 in position.

Assuming the wheels to be rotating clockwise (looking at the left hand side, as viewed in Fig. 1) the shape of teeth 61 is such that ratchet 60 is pushed away from plate 23 and no drive is transmitted. Sleeve 56, rotating with the wheel, drives collar 49 which then drives pinion 46 through teeth 47. Gears 37 and 45 then rotate gear 44 in a counter-clockwise direction so as to wind up the spring. If, now, the wheel has just left the ground and is rotating, its energy is transferred to the spring until it stops. During this spring winding process the two ratchet clutch mechanisms cooperate to prevent unwinding, since the gearing interposed between the clutch collar 49 and the spring 40 exerts a tendency to rotate collar 49 (and hence the sleeve 56 which is splined thereto) in a direction opposite to that in which the clutch 60 tends to rotate the interlocked elements 24 and 56. These opposing tendencies nullify each other and thus constitute interlocking means preventing the release of energy stored in the spring so long as the two ratchet clutch mechanisms are maintained in their normal, engaged condition.

Just before landing, cables 17 are drawn taut to push rod 14 and collar 49 to the right, free of pinion 46, which pinion will now be rotated by the force of the expanding spring 40. The spring, in unwinding, imparts rotation to the gear 44, splined sleeve 66, collar 60, and plate 23 to wheel 6. The wheel is thus accelerated to approximately the speed which it had on leaving the ground, with the result that an easy rolling contact is made as the craft lands.

If desired, collar 49 may be moved further to the right so as to engage collar 90 and then carry with it members 56, 66 and 60, thus disconnecting the device entirely from the wheel so that the plane may be backed up without winding the spring in the opposite direction. This shifting causes the spring-backed plunger 25 to engage depression 26a and thus operates to yieldably hold the parts just enumerated in this disconnected relation to the plate 23. The unit can also be made to act as a brake after landing by re-engaging teeth 47, thus re-winding spring 40, and slipping clutch 70.

Should the jaws 47 be in engagement while the plane is making its run or take off, the spring 40 will wind up until a sufficient torque is built up to slip the clutch 70 through housing 26b and shaft 73. The retarding torque on the wheel will be very much smaller than that of clutch 70, because of the high gear ratio between wheel 6 and spring 40.

There is thus disclosed a mechanism which in the form shown possesses considerable practical merit and will act efficiently to facilitate smooth and safe landing of an aircraft as well as permit movement of the craft in a reverse direction along the ground without injury to the mechanism or to the plane and which may likewise act as above noted, as a brake on the craft after it has landed. It is to be understood however, that the latter features are optional and may be dispensed with, as well as the other details not essential to the basic principles of the invention in its broadest aspects as indicated in the broadest of the appended claims. Certain of the other appended claims, however, are directed to the optional features as they also constitute a part of the invention, when considered in its other phases. Reference is therefore to be made to all of the appended claims for a definition of the entire scope of the invention.

What is claimed is:

1. The method of imparting rotary movement to the landing gear of an aircraft prior to contact of the craft with the ground comprising first storing the kinetic energy remaining in the rotatable parts of the landing gear at the moment of take-off, and then returning said energy to said rotatable parts of the landing gear as the craft approaches its destination.

2. In a driving mechanism for use in reducing friction between the landing gear of an aircraft and the ground, an energy receiving member, means drivably connecting said member with a rotatable part of the landing gear, said connecting means including a member operating to prevent the discharge of energy stored in said energy receiving member for any desired period, a second driving connection through which the energy previously stored in said last named member may be returned at will to said rotatable part, means effective to break said second named connection when it is desired to move the craft in a direction opposite to its normal direction of movement, and means including a yieldable detent operatively associated with said landing gear for holding said connection in the broken condition.

3. In a wheel driving mechanism, in combination, an energy receiving spring and a driving connection between said wheel and spring including a member operating to prevent the discharge for any desired period of energy stored in said spring, a second driving connection for returning such energy to said wheel, means for holding said second driving connection normally inoperative, manually operable means for withdrawing said holding means, said manually operable means being further effective to break said second named connection when it is desired to rotate the wheel in a direction opposite to its normal direction of rotation, and means including a yieldable detent operatively associated with said spring for holding said connection in broken condition.

4. In an airplane, a landing wheel, a spring motor engageable with said wheel, and unitary control means selectively operable either to lock said spring motor out of engagement with, to engage said spring motor in driving relation to, or to place said spring motor into condition to be wound by the rotation of said wheel.

5. In an airplane, in combination, a landing wheel, means for accumulating, storing and releasing energy, a device adapted to engage said wheel when it is being rotated by motion of said aircraft along the ground for accumulating energy in said means, a second device associated with said means adapted to engage said wheel and to release energy from said means to cause rotation of said wheel, and unitary control mechanism associated with said two devices, said mechanism being adapted to selectively operate said devices and being adapted to hold said two devices out of engagement with said wheel to allow free rotation thereof.

ROMEO M. NARDONE.